US008511207B2

(12) United States Patent
Su

(10) Patent No.: US 8,511,207 B2
(45) Date of Patent: Aug. 20, 2013

(54) ROTATION CONTROL DEVICE FOR A TOOL

(76) Inventor: Cheng-Wei Su, Taichung (TW)

( * ) Notice: Subject to any disclaimer, the term of this patent is extended or adjusted under 35 U.S.C. 154(b) by 136 days.

(21) Appl. No.: 13/300,578

(22) Filed: Nov. 19, 2011

(65) Prior Publication Data

US 2012/0067164 A1 Mar. 22, 2012

Related U.S. Application Data

(63) Continuation-in-part of application No. 12/621,490, filed on Nov. 18, 2009, now abandoned.

(30) Foreign Application Priority Data

Jul. 3, 2009 (TW) ................................ 98122619 A

(51) Int. Cl.
*F16D 1/00* (2006.01)
*F16D 3/00* (2006.01)
*F16L 41/00* (2006.01)

(52) U.S. Cl.
USPC ................ 81/177.7; 403/83; 403/85; 403/97; 403/105; 81/177.8; 254/25

(58) Field of Classification Search
USPC ................... 403/83, 84, 85, 97, 99, 103, 104, 403/105–108, 325; 254/21, 25, 28, 243, 254/244; 81/177.7, 177.8, 177.9
See application file for complete search history.

(56) References Cited

U.S. PATENT DOCUMENTS 2,921,773 A 1/1960 Hoelzer
3,186,265 A 6/1965 Anthony et al. ............. 81/177.9
5,277,427 A 1/1994 Bryan et al. .................. 473/232
5,473,929 A 12/1995 Karash ............................ 72/458
6,920,807 B2 7/2005 Bond ................................ 81/45
7,025,331 B2 4/2006 Whelan ............................ 254/25
7,267,033 B1 9/2007 Lai et al. ....................... 81/57.29
7,278,626 B1 10/2007 Chang .............................. 254/25
7,520,199 B2 4/2009 Stawarski .................... 81/177.8
7,628,382 B2 12/2009 Cole ................................ 245/25
7,682,099 B2 3/2010 Cole ................................ 403/97
2007/0113711 A1 5/2007 Tuan Mu ....................... 81/63.2
2007/0158626 A1 7/2007 Chang .............................. 254/25
2007/0169590 A1 7/2007 Cole ............................ 81/177.8
2010/0176356 A1 7/2010 Su ................................. 254/129

OTHER PUBLICATIONS

Taiwan Utility Model No. TW M260372, Apr. 1, 2005, 11 pages.
Taiwan Invention Patent No. TW 492908, Jul. 1, 2002, 4 pages.
Taiwan Utility Model No. TW 232230, Oct. 11, 1994, 3 pages.
Chinese Utility Model No. CN201169521Y, Dec. 24, 2008, 6 pages.
German Invention Patent Publication No. DE 102006028115 A1, Dec. 27, 2007, 7 pages.
Japanese Invention Patent Publication No. JP 2003-300179 A, Oct. 21, 2003, 6 pages.
Japanese Invention Patent Publication No. JP 9-131670 A, May 20, 1997, 3 pages.

*Primary Examiner* — Gregory Binda
*Assistant Examiner* — Nahid Amiri
(74) *Attorney, Agent, or Firm* — Alan Kamrath; Kamrath IP Lawfirm, P.A.

(57) ABSTRACT

A rotation control device for a tool is disposed between a handle and a tool head and includes two ratchet wheels, a spring and two C-shaped snap rings. The two ratchet wheels are symmetrically arranged. When pressed, the respective ratchet wheels will be subjected to the same force and move the same distance, thus making the engagement between the ratchet wheels and the tool head more assured, while avoiding the stuck fault and improving the convenience in use.

6 Claims, 7 Drawing Sheets

ROTATION CONTROL DEVICE FOR A TOOL

CROSS REFERENCE

This application is a continuation in part of U.S. patent application Ser. No. 12/621,490, filed Nov. 18, 2009 now abandoned.

BACKGROUND

1. Field of the Invention

The present invention relates to a device for a tool and, more particularly, to a rotation control device for a tool.

2. Description of the Prior Art

Referring to FIGS. 1-2, a conventional rotational prying tool 10 comprises a handle 11, a rotating block 12 and a prying head 13. The rotating block 12 is disposed in the handle 11, and the prying head 13 is mounted on both the handle 11 and the rotating block 12. The prying head 13 is provided with an engaging portion 131 on an inner surface thereof; while the rotating block 12 is provided with a engaging portion 121 on an outer surface thereof. The engaging portion 131 can be engaged with the engaging portion 121. Between one side of the rotating block 12 and the prying head 13 is disposed a spring 14, and the other side of the rotating block 12 is sealed with a seal cover 15. When the engaging portion 121 of the rotating block 12 is engaged with the engaging portion 131 of the prying head 13, the prying head 13 of the tool 10 can be used to perform the prying operation. When the seal cover 15 presses against the rotating block 12, causing compression of the spring 14, the engaging portion 121 of the rotating block 12 will be disengaged from the engaging portion 131 of the prying head 13, causing idle rotation between the rotating block 12 and the prying head 13. At this moment, the angle of the prying head 13 can be adjusted. However, as the rotating block 12 engages with the prying head 13 while being elastically pressed by the spring 14, it is not easy for the engaging portion 121 of the rotating block 12 and the engaging portion 131 of the prying head 13 to engage with each other in a very exact and precise manner, which will cause inconvenience in use, or even stuck fault. In addition, the single-flank engagement cannot provide enough engaging force, consequently reducing the output torque.

Moreover, U.S. Pat. No. 7,520,199 B2 discloses an "indexable pry tool and splined coupling arrangement therefore". This pry tool is too complicated in structure, since it has many types of components. Especially, the first serrated insert and the second serrated insert are two different sized components, which require different manufacturing procedures and, therefore, will increase manufacturing cost. In addition, when assembling, the first and second serrated inserts should be assembled in a strict order in such a manner that the first serrated insert after assembly must be located between the second serrated insert and the circular planar head of the hold push button. Otherwise, no angle adjustment can be made between the indexable body and the handle, causing inconvenience in assembly.

The present invention has arisen to mitigate and/or obviate the afore-described disadvantages.

SUMMARY OF THE INVENTION

The primary object of the present invention is to provide a rotation control device for a tool which can avoid the stuck fault and improve convenience in use.

Another object of the present invention is to provide a rotation control device for a tool, which is capable of reducing cost and making assembly easier.

In order to achieve the above objectives, a rotation control device for a tool in accordance with the present invention comprises: a handle, a tool head, two ratchet wheels, a spring, and two C-shaped snap rings.

The handle is formed with two assembling portions, and each of the two assembling portions is defined with a first through hole, a first ratchet portion on an inner periphery of the first through hole, and an annular groove in the inner periphery of the first through hole.

The tool head is provided with a working portion and a pivot portion pivotably disposed between the two assembling portions. In the pivot portion is defined a second through hole to be in communication with the first through hole, and on an inner periphery of the second through hole is provided a second ratchet portion.

The two ratchet wheels are disposed between the two assembling portions of the handle and the pivot portion of the tool head in such a manner that the two ratchet wheels are selectively adjusted between a close position where the two ratchet wheels are abutted against each other and a separated position where the two ratchet wheels are separated and located away from each other. Each of the ratchet wheels is provided with a ratchet portion on an outer periphery thereof, a receiving groove in an inner surface thereof, and a protrusive press portion on an outer surface thereof. The ratchet portions of the two ratchet wheels are selectively engaged with the second ratchet portion of the tool head or simultaneously engaged with the first and second ratchet portions. The press portion of each of the ratchet wheels is smaller in outer diameter than the ratchet portion of the respective ratchet wheels. When in the close position, the ratchet portions are engaged with the second ratchet portion of the tool head, so that the handle and the tool head are able to pivot with respect to each other, and when in the separated position, the ratchet portions of the ratchet wheels are engaged with the first and second ratchet portions simultaneously, so that the handle and the tool head are fixed in a non-rotatable manner to each other.

The spring is disposed between the two ratchet wheels and has its two ends pressed against receiving grooves of the two ratchet wheels to maintain the two ratchet wheels in the separated position in normal conditions.

The two C-shaped snap rings are disposed in the respective annular grooves of the assembling portions of the handle. Each of the two C-shaped snap rings is provided with an abutting surface for abutting against a lateral surface of the ratchet portions of the respective ratchet wheels, and a through hole for insertion of the press portions of the ratchet wheels.

By such arrangements, the two ratchet wheels can be pressed to compress the spring oppositely in such a manner that the two ratchet wheels can be fully engaged with the second ratchet portion of the tool head, so that the tool head can be rotated to a desired angle. The two ratchet wheels are symmetrically arranged, so that the two ratchet wheels can be subjected to the same force and move the same distance, thus avoiding the stuck fault while improving convenience in use.

DETAILED DESCRIPTION OF THE PREFERRED EMBODIMENTS

The present invention will be clearer from the following description when viewed together with the accompanying drawings, which show, for purpose of illustration only the preferred embodiments in accordance with the present invention.

Figure 1:
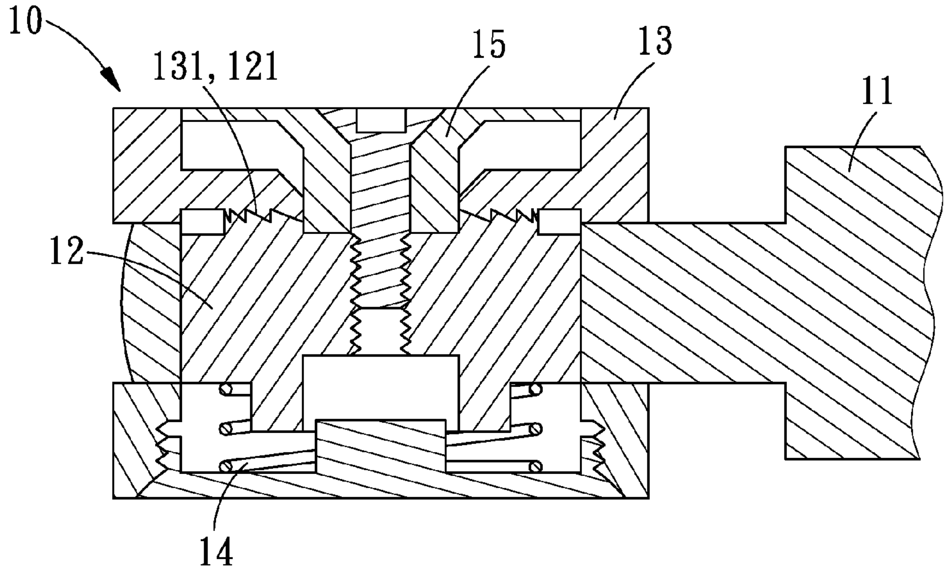
FIG. 1 PRIOR ART
FIG. 1 is a cross-sectional view of a conventional prying tool, showing a rotating block engaged with a prying head of the conventional prying tool.
Figure 2:
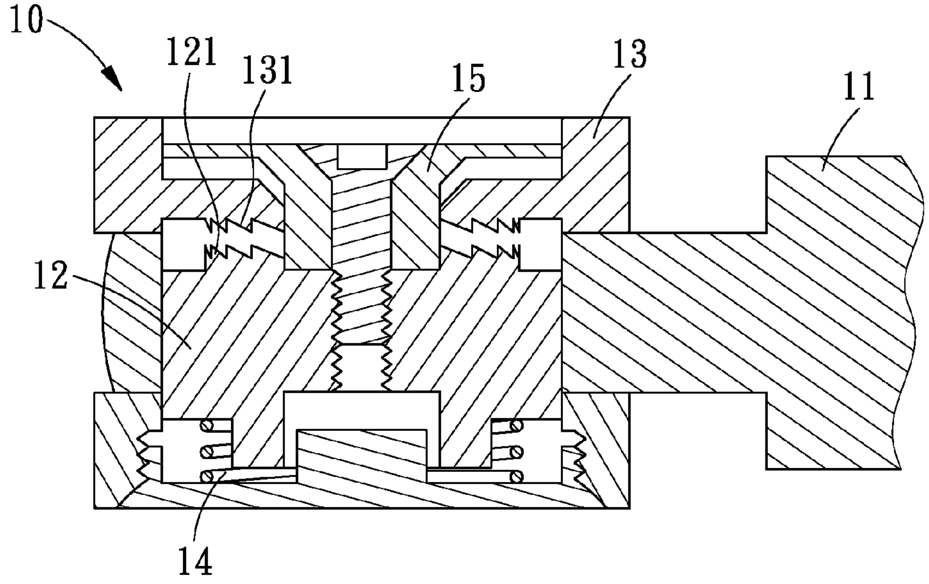
FIG. 2 PRIOR ART
FIG. 2 is a cross-sectional view of the conventional prying tool, showing the rotating block disengaged from the prying head.
Figure 3:
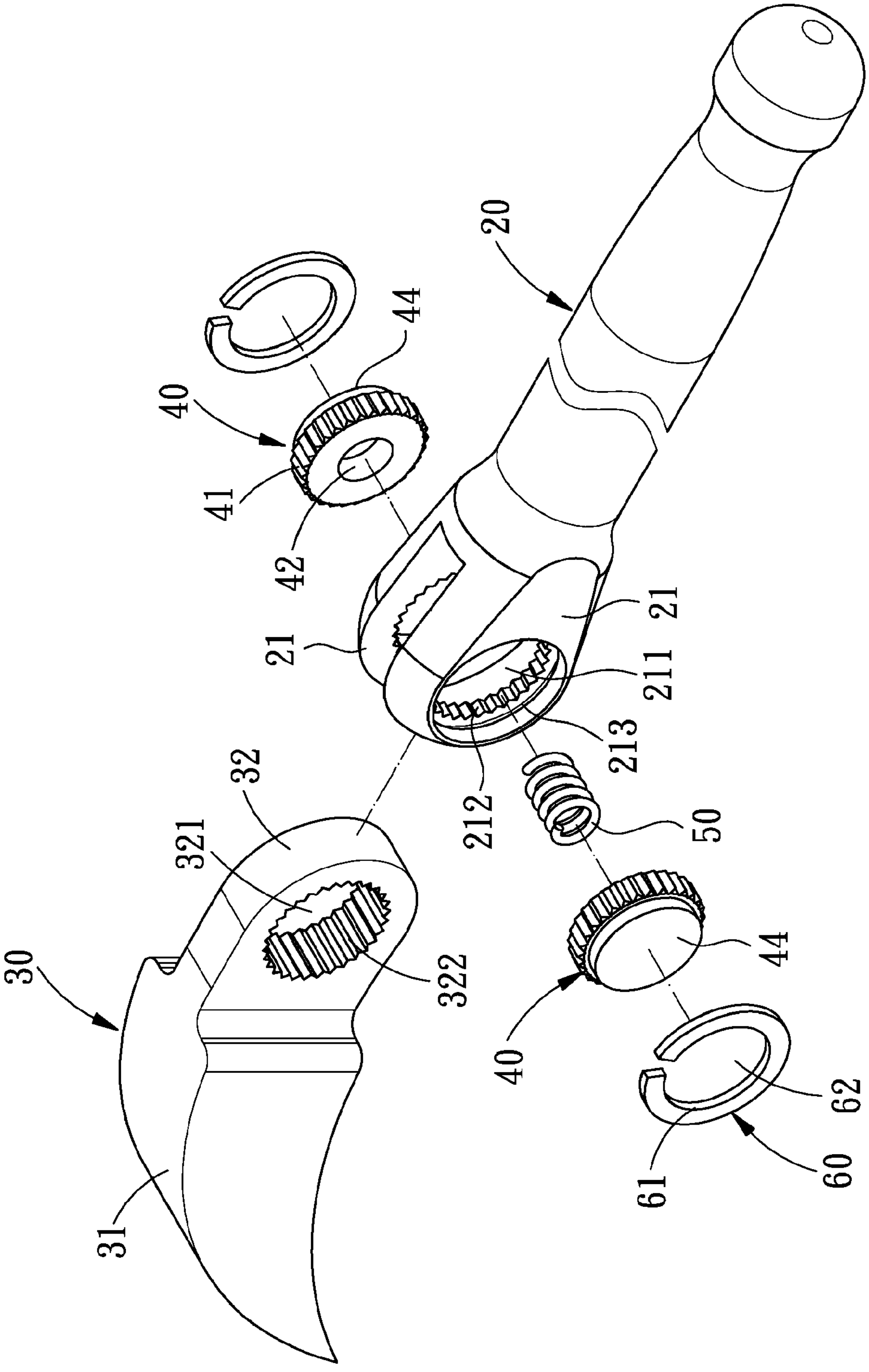
FIG. 3 is an exploded view of a rotation control device for a tool in accordance with the present invention.
Figure 4:
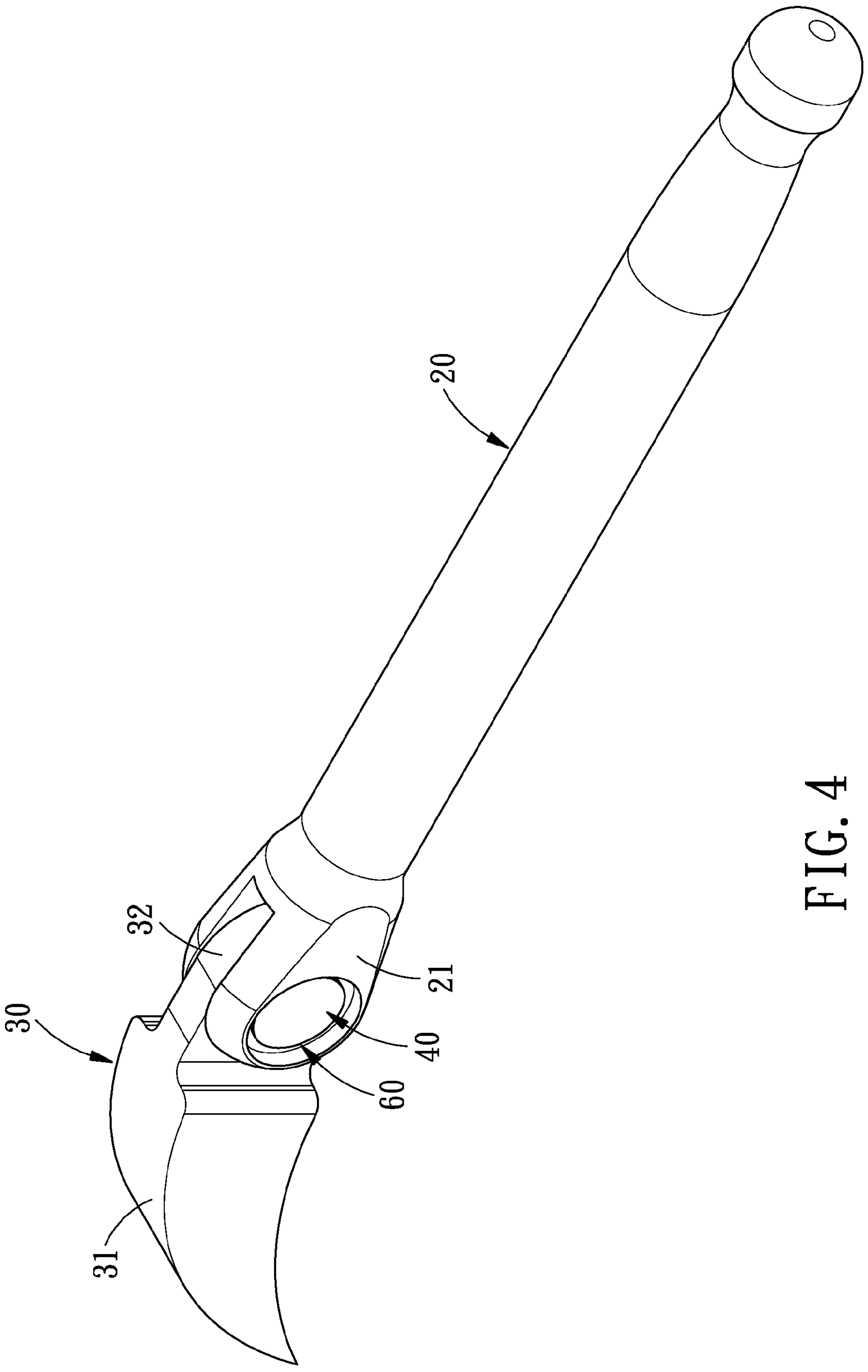
FIG. 4 is an assembly view of the rotation control device for a tool in accordance with the present invention.
Figure 5:
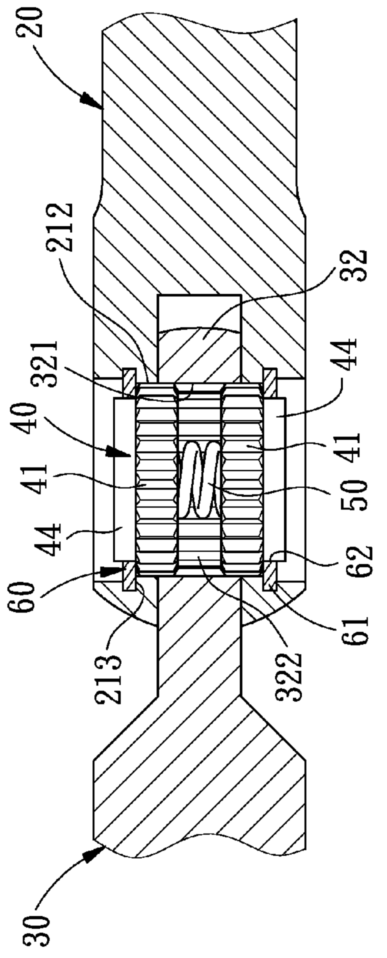
FIG. 5 is a cross-sectional view showing the engaging state of the rotation control device for a tool in accordance with the present invention.

Referring to FIGS. 3-5, a rotation control device for a tool in accordance with a preferred embodiment of the present invention comprises a handle 20, a tool head 30, two ratchet wheels 40, a spring 50, and two C-shaped snap rings 60.

The handle 20 is formed with two opposite parallel assembling portions 21 at one end thereof. Each of the two assembling portions 21 is defined with a first through hole 211. Each of the first through holes 211 is provided with a first ratchet portion 212 on an inner periphery thereof, and an annular groove 213 close to an outer edge of the inner periphery thereof.

The tool head 30 includes a working portion 31 at one end thereof, and the other end of the tool head 30 is a pivot portion 32 to be pivotally connected between the two assembling portions 21. The pivot portion 32 is defined with a second through hole 321 and a second ratchet portion 322 on an inner periphery of the second through hole 321. The second through hole 321 of the tool head 30 is in communication with the two first through holes 211 of the handle 20. In the present embodiment, the working portion 31 is in the form of a prying head.

The two ratchet wheels 40 are cylinder-shaped and disposed between the two assembling portions 21 of the handle 20 and the pivot portion 32 of the tool head 30 in such a manner that the two ratchet wheels 40 can be adjusted between a close position where the two ratchet wheels 40 are abutted against each other and a separated position where the two ratchet wheels are separated and located away from each other. Each of the ratchet wheels 40 is provided with a ratchet portion 41 on an outer periphery thereof, a receiving groove 42 and a positioning hole 43 in an inner surface thereof, and a protrusive press portion 44 on an outer surface thereof. The ratchet portions 41 can be selectively engaged with the second ratchet portion 322 of the tool head 30 or simultaneously engaged with the first and second ratchet portions 212, 322. The press portion 44 of each of the ratchet wheels 40 is smaller in outer diameter than the ratchet portion 41. When in the close position where the two ratchet wheels 40 are abutted against each other, the ratchet portions 41 are engaged with the second ratchet portion 322 of the tool head 30, so that the handle 20 and the tool head 30 are able to pivot with respect to each other. When in the separated position where the two ratchet wheels 40 are located away from each other, the ratchet portions 41 of the ratchet wheels 40 are engaged with the first and second ratchet portions 212, 322 simultaneously, so that the handle 20 and the tool head 30 are fixed in a non-rotatable manner to each other.

The spring 50 is disposed between the two ratchet wheels 40 and has its two ends pressed against the receiving grooves 42 of the two ratchet wheels 40. When the two ratchet wheels 40 are pushed back to their original positions by the spring 50 after movement, namely, in normal conditions, the two ratchet wheels 40 are maintained in the separated position where the two wheels 40 are located away from each other.

The two C-shaped snap rings 60 are disposed in the respective annular grooves 213 of the assembling portions 21 of the handle 20 for preventing the two ratchet wheels 40 from disengaging from the respective first through holes 211 of the assembling portions 21 of the handle 20. Each of the two C-shaped snap rings 60 is provided with an abutting surface 61 for abutting against the lateral surface of the ratchet portion 41 of the respective ratchet wheels 40, and a through hole 62 for insertion of the press portion 44 of the ratchet wheels 40.

The aforementioned is the summary of the positional and structural relationship of the respective components of the preferred embodiment in accordance with the present invention. In normal conditions, the two opposite ends of the spring 50 respectively push the two ratchet wheels 40 outwards (into a separated position where the two ratchet wheels 40 are located away from each other) to make the ratchet portions 41 of the two ratchet wheels 40 simultaneously engage with the respective first ratchet portions 212 of the handle 20 and the second ratchet portion 322 of the connecting rod 32 of the tool head 30. Thus, the two ratchet wheels 40 can be engaged with both the handle 20 and the tool head 30, and the tool head 30 can be fixed relative to the handle 20 and operated by a user as shown in FIGS. 4 and 5.

Figure 6:
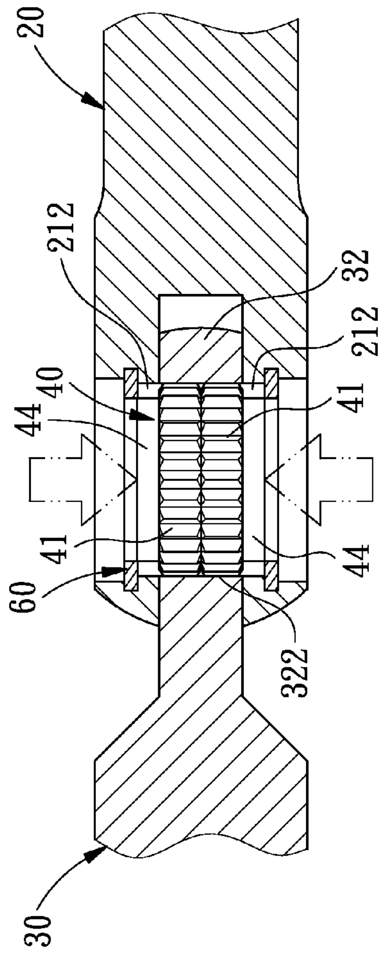
FIG. 6 is a cross-sectional view showing the ratchet wheels fully engaged with the tool head in accordance with the present invention.
Figure 7:
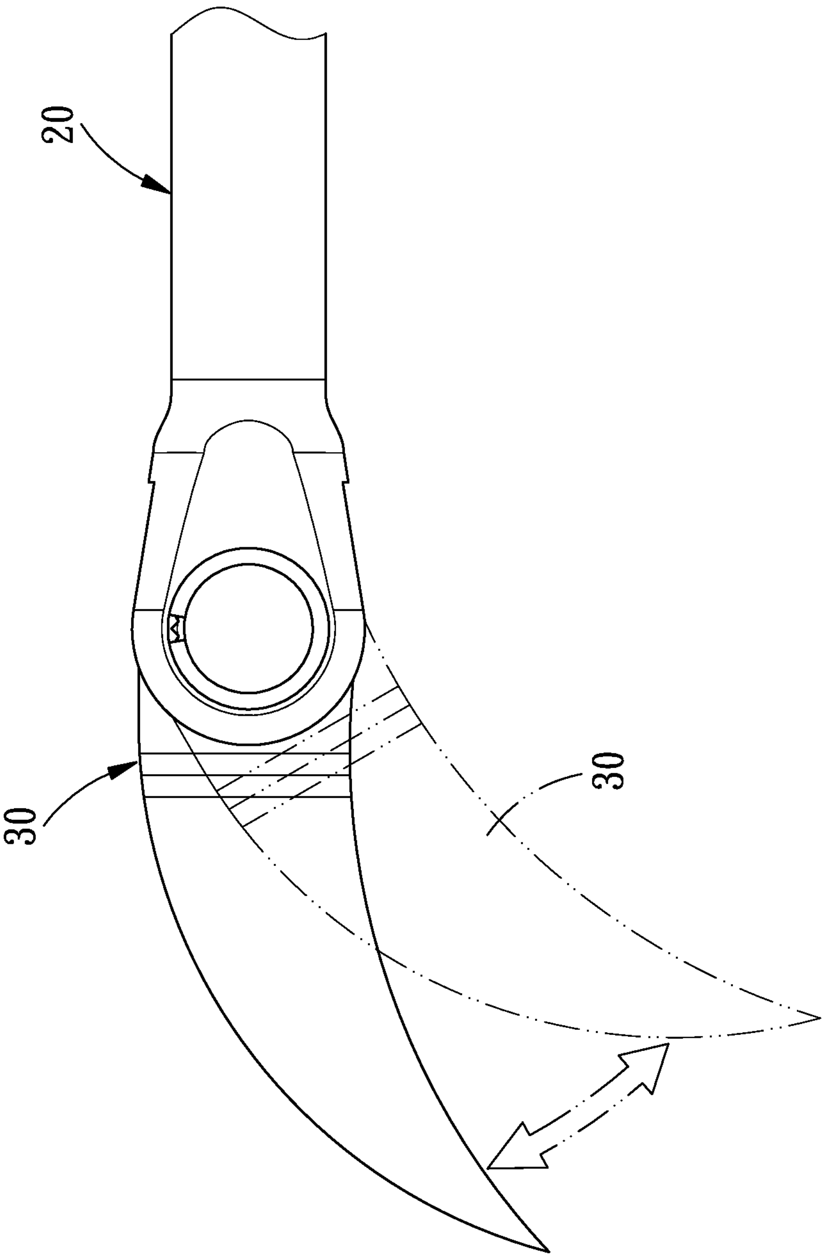
FIG. 7 is an operational view of the rotation control device for a tool in accordance with the present invention.

To adjust the angle of the tool head 30 relative to the handle 20, the press portions 44 of the two ratchet wheels 40 can be pressed to force the two ratchet wheels 40 to move towards each other to compress the spring 50. When the two ratchet wheels 40 move inwards and towards each other, the ratchet portions 41 of the two ratchet wheels 40 will disengage from the first ratchet portions 212 of the handle 20 and fully engage with the second ratchet portion 322 of the tool head 30, as shown in FIG. 6. Thus, the two ratchet wheels 40 can be rotated without being stopped by the first ratchet portions 212 of the handle 20. Namely, the tool head 30 can be rotated synchronously with the two ratchet wheels 40, and, thus, it can be adjusted to a desired angle. As shown in FIG. 7, the user will stop pressing the two ratchet wheels 40 until the tool head 30 is adjusted to the desired angle. At this moment, the spring 50 will elastically restore to its original shape and push the two ratchet wheels 40 to move away from each other and back to the separated position where the ratchet portions 41 of the two ratchet wheels 40 simultaneously engage with the respective first ratchet portions 212 of the handle 20 and the second ratchet portion 322 of the connecting rod 32 of the tool head 30. Thus, the user can use the tool head 30 which has been adjusted to the desired angle to carry out a plying operation. Additionally, since the present invention utilizes the two symmetrically-arranged ratchet wheels 40 to press the spring

50, when pressing the spring 50, the respective ratchet wheels 40 are subjected to the same force and move the same distance, thus avoiding the deviation of the ratchet wheels 40 and the occurrence of ratchet stuck fault resulting from such deviation.

Figure 8:
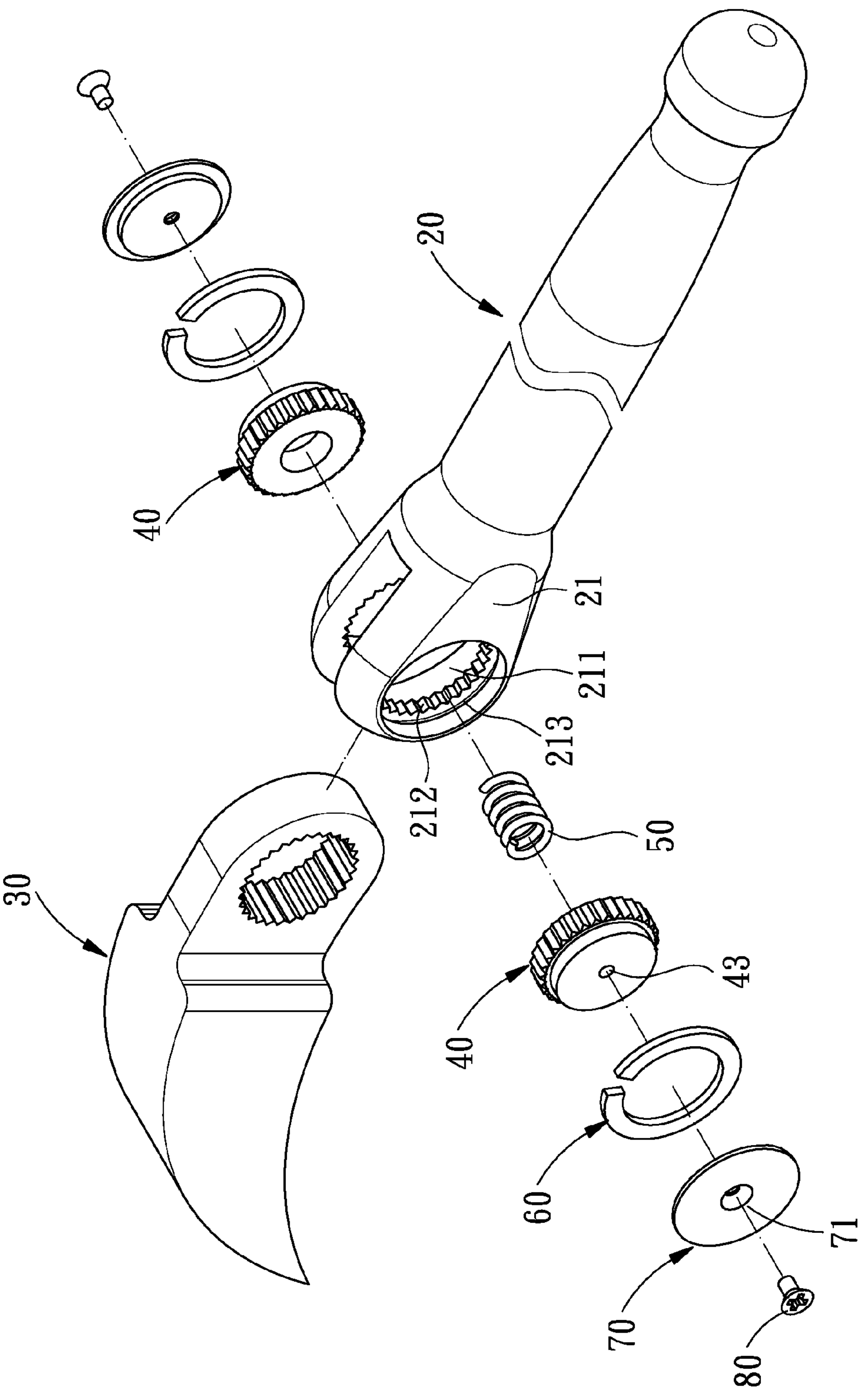
FIG. 8 is an exploded view showing the rotation control device for a tool in accordance with the present invention provided with seal covers and positioning pins.
Figure 9:
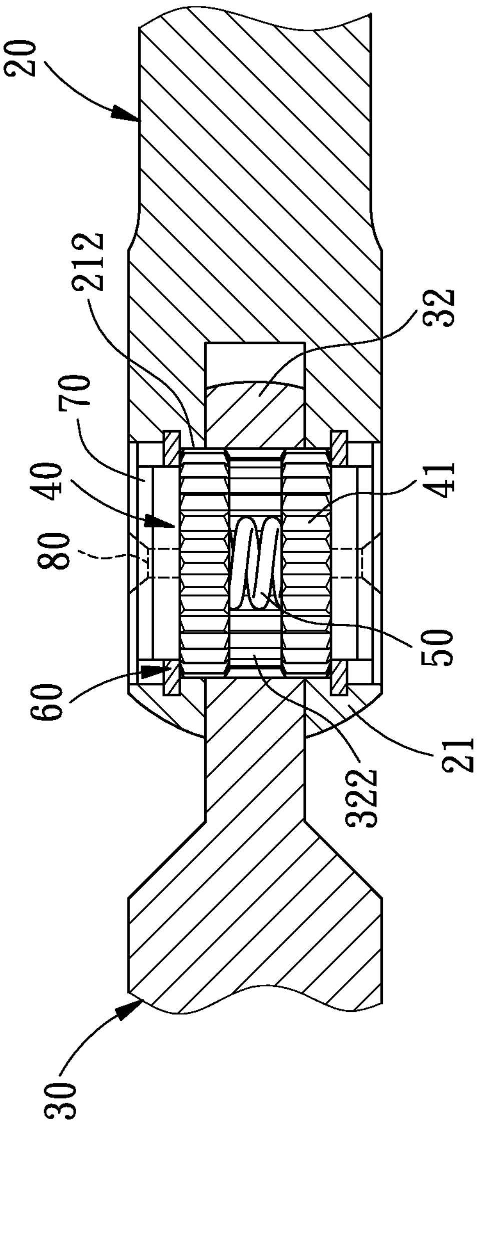
FIG. 9 is a cross-sectional view in accordance with the present invention, showing the engaging state of the rotation control device for a tool which is provided with the seal covers and positioning pins.

On top of that, the rotation control device only comprises the two ratchet wheels 40, the spring 50 and the two C-shaped snap rings 60. Furthermore, the two ratchet wheels 40 and the two C-shaped snap rings 60 are replicated structures. Hence, the present invention requires less number and types of components, and production cost is consequently reduced. Furthermore, the two ratchet wheels 40 are repeated structures with each formed with the receiving grooves 42 for reception of the spring 50, making assembly easier since the user doesn't have to tell the difference between the two ratchet wheels 40 when assembling. FIGS. 8 and 9 show another embodiment of the present invention further provided with two seal covers 70 and two positioning pins 80.

The two seal covers 70, each formed with a through hole 71, are used to cover the respective first through holes 211 of the assembling portions 21 of the handle 20 and press against the respective ratchet wheels 40.

The two positioning pins 80 are inserted through the respective through holes 71 of the two seal covers 70 and positioned in the respective positioning holes 43 of the ratchet wheels 40.

Due to the two symmetrically-arranged seal covers 70, the user can press the respective seal covers 70 with two fingers synchronously, thus facilitating force application while making it more stable to hold the handle 20.

While various embodiments in accordance with the present invention have been shown and described, it is clear to those skilled in the art that further embodiments may be made without departing from the scope of the present invention.

What is claimed is:

1. A rotation control device for a tool comprising:

a handle with two first ratchet portions;

a tool head pivotally connected to the handle and having a second ratchet portion;

two identical ratchet wheels disposed between the handle and the tool head, wherein the two ratchet wheels are selectively adjusted between a close position where the two ratchet wheels are abutted against each other and a separated position where the two ratchet wheels are separated and located away from each other, wherein each of the ratchet wheels is provided with a ratchet portion on an outer periphery thereof, a receiving groove in an inner surface thereof, and a protrusive press portion on an outer surface thereof, wherein the ratchet portions of the two ratchet wheels are selectively engaged with the second ratchet portion of the tool head or simultaneously engaged with the first and second ratchet portions, wherein the press portion of each of the ratchet wheels is smaller in outer diameter than the ratchet portion of the respective ratchet wheels, wherein when in the close position, the ratchet portions are engaged with the second ratchet portion of the tool head with the handle and the tool head pivotable with respect to each other, and wherein when in the separated position, the ratchet portions of the ratchet wheels are engaged with the first and second ratchet portions simultaneously with the handle and the tool head fixed in a non-rotatable manner to each other; and a spring disposed between the two ratchet wheels and having two ends pressed against receiving grooves of the two ratchet wheels to maintain the two ratchet wheels in the separated position in normal conditions.

2. The rotation control device for a tool as claimed in claim 1, wherein the handle is formed with two assembling portions, with each of the two assembling portions defined with a first through hole, with an annular groove formed in an inner periphery of the respective first through holes, with the first ratchet portions also formed on the inner periphery of the first through holes, with the tool head provided with a working portion and a pivot portion pivotably disposed between the two assembling portions, wherein in the pivot portion is defined a second through hole in communication with the first through hole, wherein on an inner periphery of the second through hole is provided a second ratchet portion, and wherein two C-shaped snap rings are disposed in the respective annular grooves of the assembling portions of the handle and each is provided with an abutting surface for abutting against a lateral surface of the ratchet portions of the respective ratchet wheels and a through hole for insertion of the press portions of the ratchet wheels.

3. The rotation control device for a tool as claimed in claim 1, wherein the working portion is in the form of a prying head.

4. The rotation control device for a tool as claimed in claim 1 further comprising two seal covers covering the respective first through holes of the assembling portions and pressing against the respective ratchet wheels.

5. The rotation control device for a tool as claimed in claim 3, wherein each of the ratchet wheels is formed with a positioning hole in the outer surface thereof, wherein each of the seal covers is formed with a through hole, and wherein two positioning pins are inserted through the respective through holes of the seal covers and positioned in positioning holes of the respective ratchet wheels.

6. A rotation control device for a tool comprising:

a handle with a first ratchet portion;

a tool head pivotally connected to the handle and having two second ratchet portions;

two identical ratchet wheels disposed between the handle and the tool head, wherein the two identical ratchet wheels are selectively adjusted between a close position where the two identical ratchet wheels abut against each other and a separated position where the two identical ratchet wheels are separated and located away from each other, wherein each of the two identical ratchet wheels is provided with a ratchet portion on an outer periphery thereof, a receiving groove in an inner surface thereof, and a protrusive press portion on an outer surface thereof, wherein the ratchet portions of the two identical ratchet wheels are selectively engaged with the first ratchet portion of the handle or simultaneously engaged with the first and second ratchet portions, wherein the press portion of each of the two identical ratchet wheels is smaller in outer diameter than the ratchet portion of the respective ratchet wheel, wherein when in the close position, the ratchet portions of the two identical ratchet wheels are engaged with the first ratchet portion of the handle, with the handle and the tool head pivotable with respect to each other, and wherein when in the separated position, the ratchet portions of the two identical ratchet wheels are engaged with the first and second ratchet portions simultaneously, with the handle and the tool head fixed in a non-rotatable manner to each other; and a spring disposed between the two identical ratchet wheels and having two ends pressed against receiving grooves of the two identical ratchet wheels to maintain the two identical ratchet wheels in the separated position in normal conditions.

* * * * *